United States Patent
Omiya (10) Patent No.: US 9,189,878 B2
(45) Date of Patent: Nov. 17, 2015

(54) DISPLAY CONTROLLER, DISPLAY CONTROL METHOD, AND RECORDING MEDIUM THAT STORES PROGRAM

(71) Applicant: P&W Solutions Co., Ltd., Tokyo (JP)

(72) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 0 days.

(21) Appl. No.: 14/459,632

(22) Filed: Aug. 14, 2014

(65) Prior Publication Data

US 2015/0054857 A1 Feb. 26, 2015

(30) Foreign Application Priority Data

Aug. 21, 2013 (JP) ................ 2013-170906

(51) Int. Cl.
| | |
|---|---|
| G09G 5/00 | (2006.01) |
| G06T 11/60 | (2006.01) |
| G06F 3/0483 | (2013.01) |
| G06F 3/0485 | (2013.01) |
| G06F 3/0488 | (2013.01) |
| G06F 3/0482 | (2013.01) |
| G06F 3/0481 | (2013.01) |
| G06F 3/0484 | (2013.01) |

(52) U.S. Cl.
CPC .............. *G06T 11/60* (2013.01); *G06F 3/0482* (2013.01); *G06F 3/0483* (2013.01); *G06F 3/0485* (2013.01); *G06F 3/04883* (2013.01); *G06F 3/0481* (2013.01); *G06F 3/04842* (2013.01); *G06F 2203/04805* (2013.01)

(58) Field of Classification Search
None
See application file for complete search history.

(56) References Cited

U.S. PATENT DOCUMENTS

| | | | |
|---|---|---|---|
| 6,253,218 B1 * | 6/2001 | Aoki et al. | 715/201 |
| 2011/0084921 A1 * | 4/2011 | Kang et al. | 345/173 |
| 2013/0145266 A1 * | 6/2013 | Mantia et al. | 715/716 |

FOREIGN PATENT DOCUMENTS

JP 2009-140083 6/2009

* cited by examiner

*Primary Examiner* — Jwalant Amin
(74) *Attorney, Agent, or Firm* — SoCal IP Law Group LLP; Steven C. Sereboff; John E. Gunther (57) ABSTRACT

A display controller 1 displays each of a sequence of a plurality of card images 81 to 87 to move in a first direction, and to move back and forth in a second direction, in accordance with scroll operation type. The display controller 1 determines a superposition order of displaying each of the sequence of the plurality of card images 81 to 87 in accordance with displacement of a display position of each of the sequence of the plurality of card images 81 to 87 in the second direction, and displays each of the sequence of the plurality of card images to be superposed in the order, on a display unit 17.

6 Claims, 7 Drawing Sheets

CONTINUOUS INFORMATION STORAGE TABLE

| IDENTIFICATION NUMBER | FULL NAME | ... |
|---|---|---|
| 0001 | ICHIRO AOKI | ... |
| 0002 | JIRO AOYAMA | ... |
| 0003 | TARO IGAWA | ... |
| 0004 | JIRO INOUE | ... |
| 0005 | ICHIRO UNO | ... |
| 0006 | ICHIRO EDANO | ... |
| 0007 | TARO OGAWA | ... |

DISPLAY CONTROLLER, DISPLAY CONTROL METHOD, AND RECORDING MEDIUM THAT STORES PROGRAM

This application is based on and claims the benefit of priority from Japanese Patent Application No. 2013-170906, filed on 21 Aug. 2013, the content of which is incorporated herein by reference.

BACKGROUND OF THE INVENTION

1. Field of the Invention

The present disclosure relates to a display controller, a display control method, and a program.

2. Related Art

There exists a display controller for displaying a sequence of a plurality of images corresponding to a sequence of a plurality of information items, in which scrolling and moving are performed to improve visibility.

Under present circumstances, such a display controller is required to improve the visibility of the sequence of the plurality of images corresponding to the sequence of the plurality of information items.

SUMMARY OF THE INVENTION

A display controller includes an initial image display controller, a scroll operation receiving unit, a first direction movement display controller, a movement operation receiving unit, a displacement determination unit, and a second direction movement display controller. The initial image display controller causes a predetermined display device to display a sequence of a plurality of images, which respectively correspond to a sequence of a plurality of information items, to be sequentially superposed and arranged in a first direction. The scroll operation receiving unit receives a scroll operation in the first direction. The first direction movement display controller causes the display device to display each of the sequence of the plurality of images, which are displayed on the display device under the control of the initial image display controller, to move in the first direction in accordance with the scroll operation. The movement operation receiving unit receives a movement operation representing an instruction to designate one or more images from among the sequence of the plurality of images, and to move the designated one or more images in a second direction substantially orthogonal to the first direction. The displacement determination unit individually determines displacement of each of the one or more images designated by the movement operation in the second direction, based on a superposition order of each of the sequence of the plurality of images. The second direction movement display controller displays each of the one or more images designated by the movement operation, among the sequence of the plurality of images displayed on the display device under the control of the initial image display controller or the first direction movement display controller, to move in the second direction on the display device by the respective displacements individually determined by the displacement determination unit.

A display control method executed by a display controller includes an initial image display controlling step, a scroll operation receiving step, a first direction movement display controlling step, a movement operation receiving step, a displacement determining step, and a second direction movement display controlling step. The initial image display controlling step causes a predetermined display device to display a sequence of images, which respectively correspond to a sequence of a plurality of information items, to be sequentially superposed and arranged in a first direction. The scroll operation receiving step receives a scroll operation in the first direction. The first direction movement display controlling step causes the display device to display each of the sequence of the plurality of images, which are displayed on the display device under the processing control of the initial image display controlling step, to move in the first direction in accordance with the scroll operation. The movement operation receiving step receives a movement operation representing an instruction to designate one or more images from among the sequence of the plurality of images, and to move the designated one or more images in a second direction substantially orthogonal to the first direction. The displacement determination step individually determines displacement of each of the one or more images designated by the movement operation in the second direction, based on a superposition order of each of the sequence of the plurality of images. The second direction movement display controlling step displays each of the one or more images designated by the movement operation, among the sequence of the plurality of images displayed on the display device under the control of the initial image display controlling step or the first direction movement display controlling step, to move in the second direction on the display device by the respective displacements individually determined in the displacement determining step. A program stored in a recording medium causes a computer, which controls a display controller, to execute control processing including: an initial image display controlling step, a scroll operation receiving step, a first direction movement display controlling step, a movement operation receiving step, a displacement determining step, and a second direction movement display controlling step. The initial image display controlling step causes a predetermined display device to display a sequence of a plurality of images, which respectively correspond to a sequence of a plurality of information items, to be sequentially superposed and arranged in a first direction. The scroll operation receiving step receives a scroll operation in the first direction. The first direction movement display controlling step causes the display device to display each of the sequence of the plurality of images, which are displayed on the display device under the processing control of the initial image display controlling step, to move in the first direction in accordance with the scroll operation. The movement operation receiving step receives a movement operation representing an instruction to designate one or more images from among the sequence of the plurality of images, and to move the designated one or more images in a second direction substantially orthogonal to the first direction. The displacement determination step individually determines displacement of each of the one or more images designated by the movement operation in the second direction, based on a superposition order of each of the sequence of the plurality of images. The second direction movement display controlling step displays each of the one or more images designated by the movement operation, among the sequence of the plurality of images displayed on the display device under the control of the initial image display controlling step or the first direction movement display controlling step, to move in the second direction on the display device, by the respective displacements individually determined in the displacement determining step.

DETAILED DESCRIPTION OF THE INVENTION

An embodiment of the present disclosure is hereinafter described with reference to the drawings.

Figure 1:
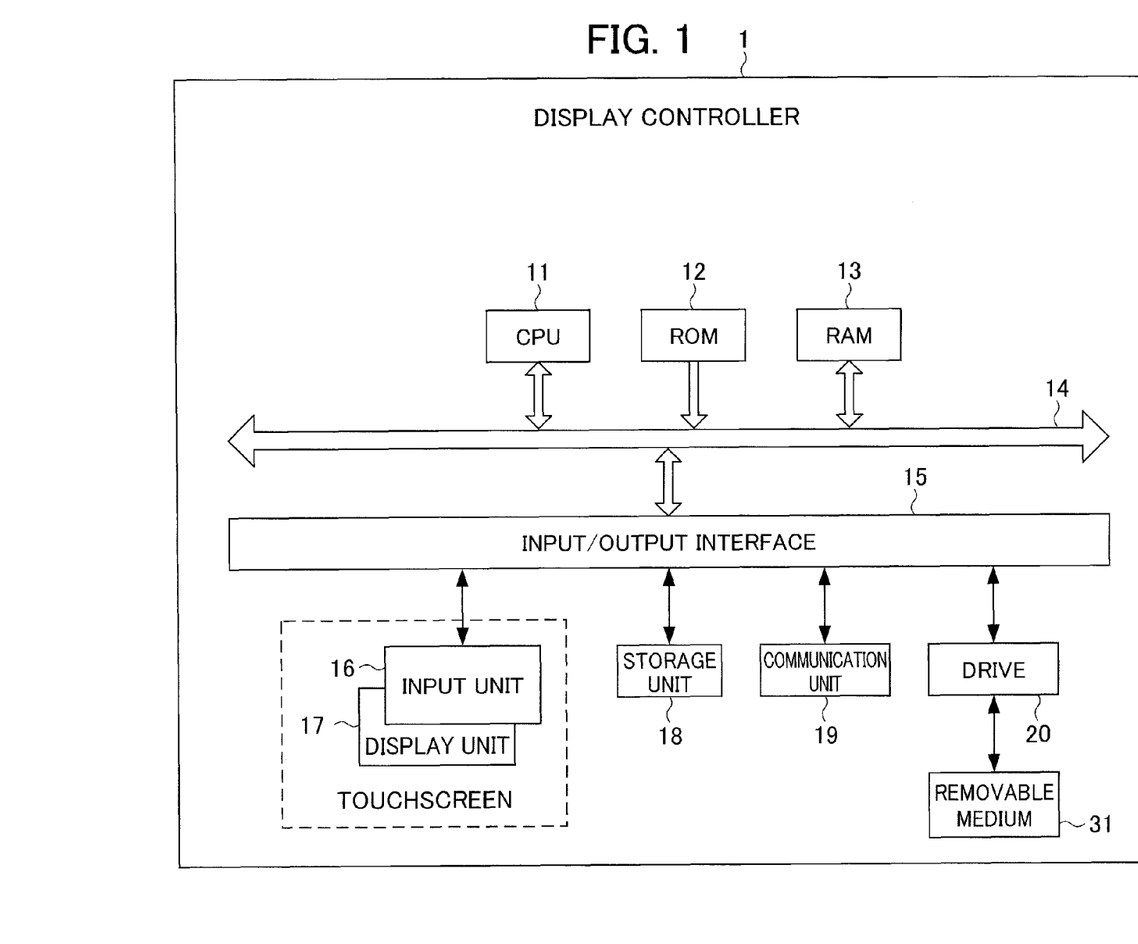
FIG. 1 is a block diagram showing a hardware configuration of a display controller according to an embodiment of the present disclosure.

FIG. 1 is a block diagram showing a hardware configuration of a display controller according to the embodiment of the present disclosure.

The display controller 1 includes: a CPU (Central Processing Unit) 11, ROM (Read Only Memory) 12, RAM (Random Access Memory) 13, a bus 14, an input/output interface 15, an input unit 16, a display unit 17, a storage unit 18, a communication unit 19, and a drive 20.

The CPU 11 executes various types of processing in accordance with programs recorded in the ROM 12 or programs loaded into the RAM 13 from the storage unit 18.

The RAM 13 appropriately stores data, etc. required for the CPU 11 to execute various types of processing.

The CPU 11, the ROM 12 and the RAM 13 are mutually connected via the bus 14. The input/output interface 15 is also connected to the bus 14. The input unit 16, the display unit 17, the storage unit 18, the communication unit 19 and the drive 20 are connected to the input/output interface 15.

The input unit 16 is configured by, for example, a capacitive or resistive position input sensor that is laminated on a display area of the display unit 17. The input unit 16 detects coordinates of a position where a touch operation was performed. The touch operation refers to a contact operation or a proximity operation by an object (a user's finger, stylus or the like) with respect to the input unit 16. The position where a touch operation is performed is hereinafter referred to as "touch position", and coordinates of the touch position are hereinafter referred to as "touch coordinates".

The display unit 17 is configured by a display and displays various images.

More specifically, in the present embodiment, a touchscreen is configured by the input unit 16 and the display unit 17.

The storage unit 18 is configured by a hard disk or DRAM (Dynamic Random Access Memory), and stores data of various images.

The communication unit 19 controls communication with other devices (not shown) via networks including the Internet.

A removable medium 31 is mounted to the drive 20 as appropriate. The removable medium 31 is composed of a magnetic disk, an optical disk, a magneto-optical disk, semiconductor memory, or the like. The drive 20 reads a program(s) from the removable medium 31. The program(s) is installed in the storage unit 18 as necessary. Similarly to the storage unit 18, the removable medium 31 can store a variety of data such as image data stored in the storage unit 18.

Figure 2:
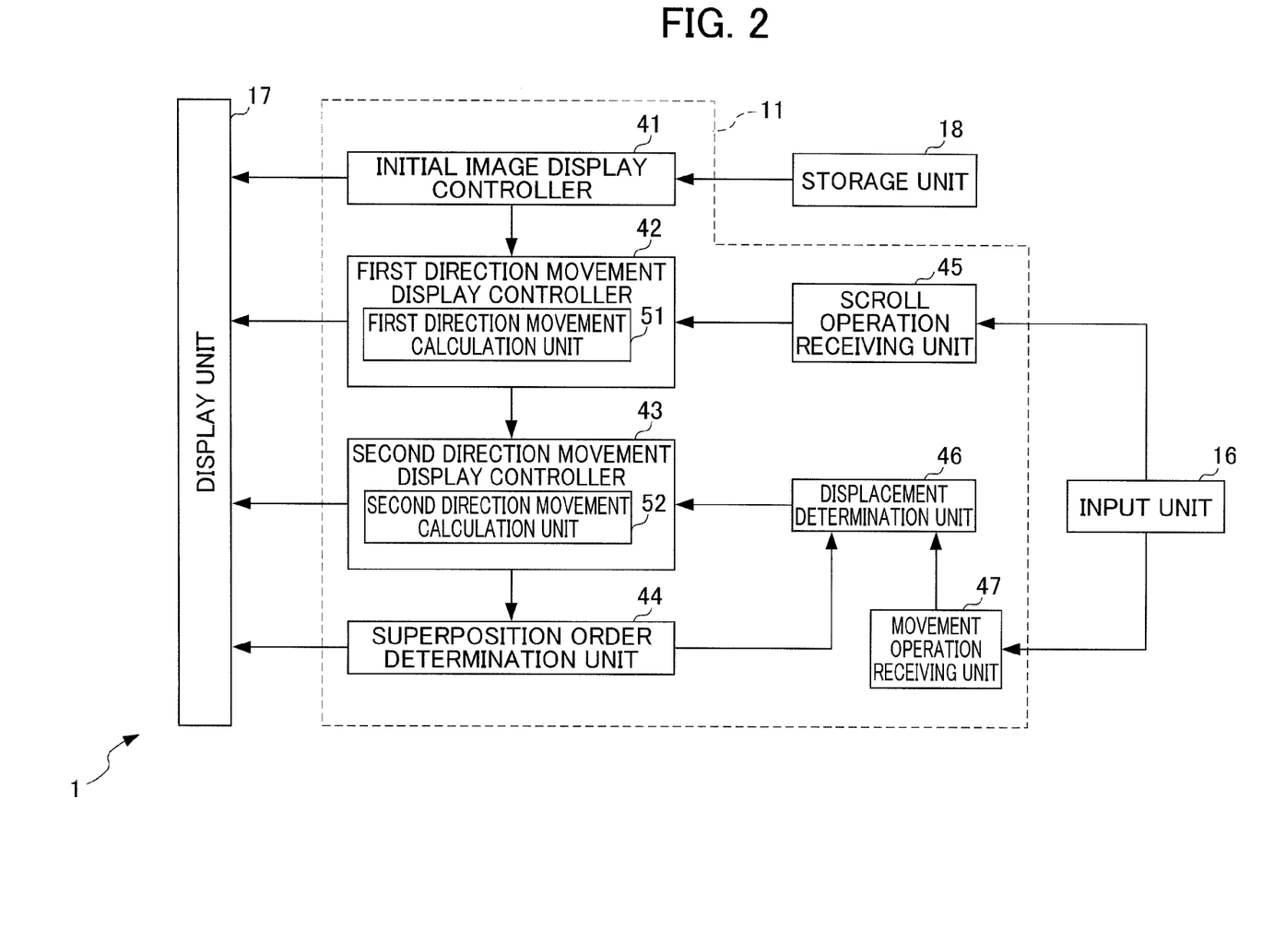
FIG. 2 is a functional block diagram showing a functional configuration for executing scroll display processing and second direction movement display processing, among functional configurations of the display controller of FIG. 1.

FIG. 2 is a functional block diagram showing a functional configuration for executing scroll display processing and second direction movement display processing, among functional configurations of the display controller 1.

The scroll display processing refers to processing in which each of a sequence of images, which are displayed as sequentially superposed and arranged in a predetermined direction (hereinafter referred to as "first direction"), is displayed to be scrolled and move in a predetermined direction, and is displayed to move back and forth in a direction (hereinafter referred to as "second direction") substantially orthogonal to the predetermined direction. As a result, when attention is focused on a predetermined one of the sequence of the plurality of images, an overall predetermined image is displayed to move in an approximate dogleg shape or an approximate arc.

Furthermore, in the scroll display processing, each of the sequence of images is displayed such that an image is displayed with a higher superposition order, the larger the displacement of the image in the second direction. Here, the displacement in the second direction refers to an amount representing how each of the sequence of the plurality of images is displayed as displaced in the second direction, in relation to a predetermined reference point on a display surface of the display unit 17 that displays the sequence of the plurality of images.

The second direction movement display processing refers to the following processing, which is executed concurrently with or separately from the scroll display processing. More specifically, in a state where a sequence of a plurality of images respectively corresponding to a sequence of a plurality of information items are displayed as sequentially superposed and arranged in the first direction on a predetermined display device, and in a case in which an operation representing an instruction to designate at least one image from the sequence of the plurality of images, and to move the image in the second direction (hereinafter referred to as "movement operation") is performed, the following processing is executed.

More specifically, displacement of each of the one or more designated images in the second direction is individually determined, based on a superposition order of each of the sequence of the plurality of images. Among the sequence of the plurality of images, each of the one or more images designated by the movement operation is displayed to move in the second direction on the display device by the respective individually determined displacements. This processing is the second direction movement display processing.

In a case in which the execution of the scroll display processing is controlled, an initial image display controller 41, a first direction movement display controller 42, a second direction movement display controller 43, a superposition order determination unit 44, and a scroll operation receiving unit 45 function in the CPU 11. A first direction movement calculation unit 51 functions in the first direction movement display controller 42. Furthermore, a second direction movement calculation unit 52 functions in the second direction movement display controller 43.

In a case in which the execution of the second direction movement display processing is controlled, a movement operation receiving unit 46 and a displacement determination unit 47 further function in the CPU 11, in addition to the above-mentioned functional blocks.

The units, from the initial image display controller 41 to the displacement determination unit 47, which function in the CPU 11, are only illustrated as examples. That is, at least some of the functions of the units, from the initial image display controller 41 to the displacement determination unit 47, can also be assigned to components other than the CPU 11 (for example, a special purpose processor for image processing, etc. (not shown)).

When the scroll display processing is initiated, the initial image display controller 41 acquires a sequence of information from a continuous information storage table (see FIG. 3) stored in the storage unit 18. Here, the continuous information storage table refers to a table that stores a sequence of plurality of information items serving as a basis of a sequence of images to be displayed on the display unit 17.

Figure 3:
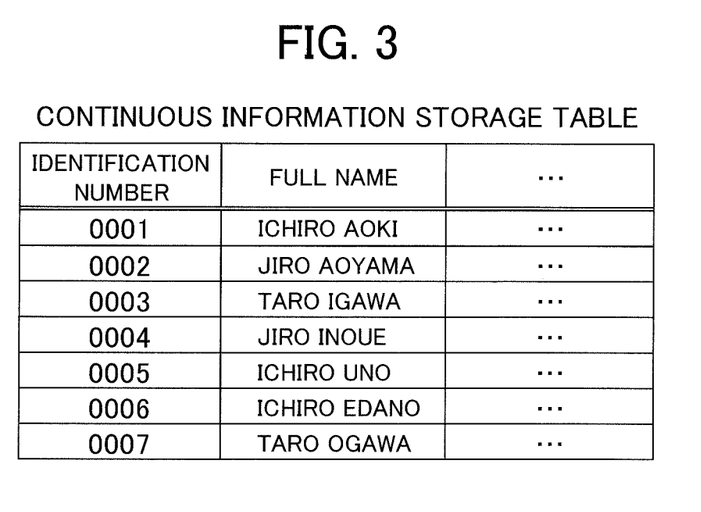
FIG. 3 is a diagram showing an example of a continuous information storage table.

In the example shown in FIG. 3, the continuous information storage table is composed of various items such as an identification number and a full name in association with one another.

In the continuous information storage table, a predetermined single line corresponds to a predetermined person. More specifically, private information, etc. of each of a plurality of persons belonging to a predetermined organization are stored in each line of the continuous information storage table.

More specifically, an identification number "0001" is assigned in advance to a person associated with the first line. Therefore, the identification number "0001", the full name "Ichiro Aoki" of the person, and other private information of the person, are stored in association with one another in the first line. The same applies to information of identification numbers "0002" to "0007".

The initial image display controller 41 acquires respective information items of identification numbers "0001" to "0007" as a sequence of plurality of information items from the continuous information storage table.

Subsequently, the initial image display controller 41 generates data of a plurality of card-like images (hereinafter referred to as "card images") including each of the acquired sequence of the plurality of information items, and displays the sequence of the plurality of card images stacked in a predetermined order on the display unit 17.

As shown in FIG. 4A, as a specific example of displaying a sequence of card images, a card image 81 corresponding to "Ichiro Aoki", a card image 82 corresponding to "Jiro Aoyama", a card image 83 corresponding to "Taro Igawa", a card image 84 corresponding to "Jiro Inoue", a card image 85 corresponding to "Ichiro Uno", a card image 86 corresponding to "Ichiro Edano", and a card image 87 corresponding to "Taro Ogawa" are displayed as superposed and arranged in the scrolling direction (hereinafter referred to as "first direction"). Display sizes (resolution) of the card images 81 to 87 are the same. More specifically, the shape of the card images 81 to 87 is substantially rectangular, in which horizontal and vertical lengths (i.e. area) thereof are constant.

When each of the card images 81 to 87 is scrolled and moved, the images are displayed as displaced in a direction substantially orthogonal to the scroll direction, i.e. in the second direction. Here, among the card images 81 to 87, an image with larger displacement in the second direction is displayed with a higher superposition order.

In the example shown in FIG. 4A, the card image 82 has the largest displacement in the second direction; therefore, the card image 82 is first in superposition order, and is displayed at the top. The other images are also displayed to be superposed in a superposition order which is higher as the displacement in the second direction is larger.

Full names are displayed on both top and bottom ends of each of the card images 81 to 87. By displaying full names in this manner, a user can easily visibly confirm a full name corresponding to each of the card images 81 to 87, whatever the superposition order of each of the card images 81 to 87 is.

The user performs a scroll operation in a state where the sequence of the plurality of card images 81 to 87 is displayed. The initial image display controller 41 then causes the scroll operation receiving unit 45 to receive the scroll operation, based on temporal transition of the position of the touch operation on the touchscreen by the user (the touched position on the touchscreen), and notifies the first direction movement display controller 42 of the result.

The first direction movement display controller 42 then controls the movement display of each of the card images 81 to 87 in the first direction.

More specifically, the first direction movement display controller 42 causes the first direction movement calculation unit 51 to function. The first direction movement calculation unit 51 extracts a first direction component of the scroll operation, and calculates movement of each of the card images 81 to 87 in the first direction, based on the extracted first direction component. Each movement of the card images 81 to 87 in the first direction is calculated in a single uniform way.

Subsequently, the first direction movement display controller 42 causes the display unit 17 to display each of the card images 81 to 87 to move in the first direction by the movement amount.

While each of the card images 81 to 87 is displayed to move in the first direction, the first direction movement display controller 42 causes the second direction movement display controller 43 to control the display of each of the card images 81 to 87 to move in the second direction. More specifically, the second direction movement display controller 43 causes the second direction movement calculation unit 52 to function. Based on the movement of each of the card images 81 to 87 in the first direction calculated by the first direction movement calculation unit 51, the second direction movement calculation unit 52 calculates movement of each of the card images 81 to 87 in the second direction.

For example, descriptions are provided with reference to FIG. 4A. In a case in which the card image 82 with the first superposition order, i.e. the image displayed at the top, is a reference image, regarding each of the other card images 83 to 87 displayed on a reverse side in the first direction with respect to the reference image, movement thereof is calculated so as to be displayed to move in the second direction. On the other hand, regarding the card image 82 as the reference image, as well as the card image 81 displayed farther in the first direction than the reference image, movement thereof is calculated to be displayed to move in the reverse side with respect to the second direction.

More specifically, when the second direction is a forward direction, regarding the card images 83 to 87 on the reverse side in the first direction with respect to the reference image (the card image 82), movement thereof in the forward direction is calculated; and regarding the reference image (the card image 82) and the card image 81 on the side in the first direction, movement thereof in a backward direction is calculated.

Subsequently, the second direction movement display controller 43 causes the display unit 17 to display each of the card images 81 to 87 to move in the second direction or in a direction opposite thereto by the movement amount.

When the second direction movement display controller 43 causes each of the card images 81 to 87 to be displayed to move in the second direction, the superposition order determination unit 44 determines a superposition order of each of the card images 81 to 87, based on displacement of each of the card images 81 to 87 in the second direction. More specifically, the superposition order determination unit 44 determines a superposition order of each of the images 81 to 87 such that an image with larger displacement in the second direction has a higher superposition order.

Furthermore, the superposition order determination unit 44 causes the display unit 17 to display each of the card images 81 to 87 to be superposed in the determined superposition order.

Each of the card images 81 to 87 is displayed to move overall in an approximate dogleg shape or an approximate arc, by the first direction movement display controller 42, the second direction movement display controller 43, and the superposition order determination unit 44. Furthermore, among each of the card images 81 to 87, an image with larger displacement in the second direction is displayed with a higher superposition order. Therefore, since a card image with the maximum displacement in the second direction is displayed on the top, the visibility of an image corresponding to noteworthy information is improved.

The display size (resolution) of the card images 81 to 87 is constant. Therefore, since each of the card images 81 to 87 is displayed to be scrolled as if turning over an actual card, the visibility of an image corresponding to noteworthy information is improved, even if the display size is not changed.

Here, a specific example of the movement display of the card images 81 to 87 is described with reference to FIG. 4.

In FIG. 4A, when an operation is performed by the user to move the position of the touch operation on the touchscreen (the position touched by the finger 91 on the touchscreen) in the first direction, i.e. when a scroll operation is performed, the card images 81 and 82 are displayed to move in the first direction, and are displayed to move in the direction opposite to the second direction. The card images 83 to 87 are displayed to move in the first direction, and are displayed to move in the second direction.

As shown in FIG. 4B, during the process, the displacement of the card image 83 in the second direction becomes larger than the displacement of the card image 81 in the second direction, and the superposition is in the order of the card image 83 and the card image 81; therefore, the card image 83 is displayed to be superposed on the card image 81.

Furthermore, as shown in FIG. 4C, when a scroll operation in the first direction is performed, the displacement of the card image 83 in the second direction becomes larger than the displacement of the card image 82 in the second direction. Therefore, since the superposition order of the card image 83 becomes the highest, the card image 83 is displayed on the top. Furthermore, the displacement of the card image 84 in the second direction becomes larger than the displacement of the card image 81 in the second direction, and the superposition is in the order of the card image 84 and the card image 81; therefore, the card image 84 is displayed to be superposed on the card image 81.

Next, the second direction movement display processing is described.

As described above, the second direction movement display processing can be executed concurrently with the scroll display processing. More specifically, second direction movement display processing can be executed while each of the card images 81 to 87 is displayed (scrolled) to move in the first direction. However, descriptions are hereinafter provided for convenience by assuming that the second direction movement display processing is executed in a case in which display of movement in the first direction of each of the card images 81 to 87 is suspended.

Figure 5:
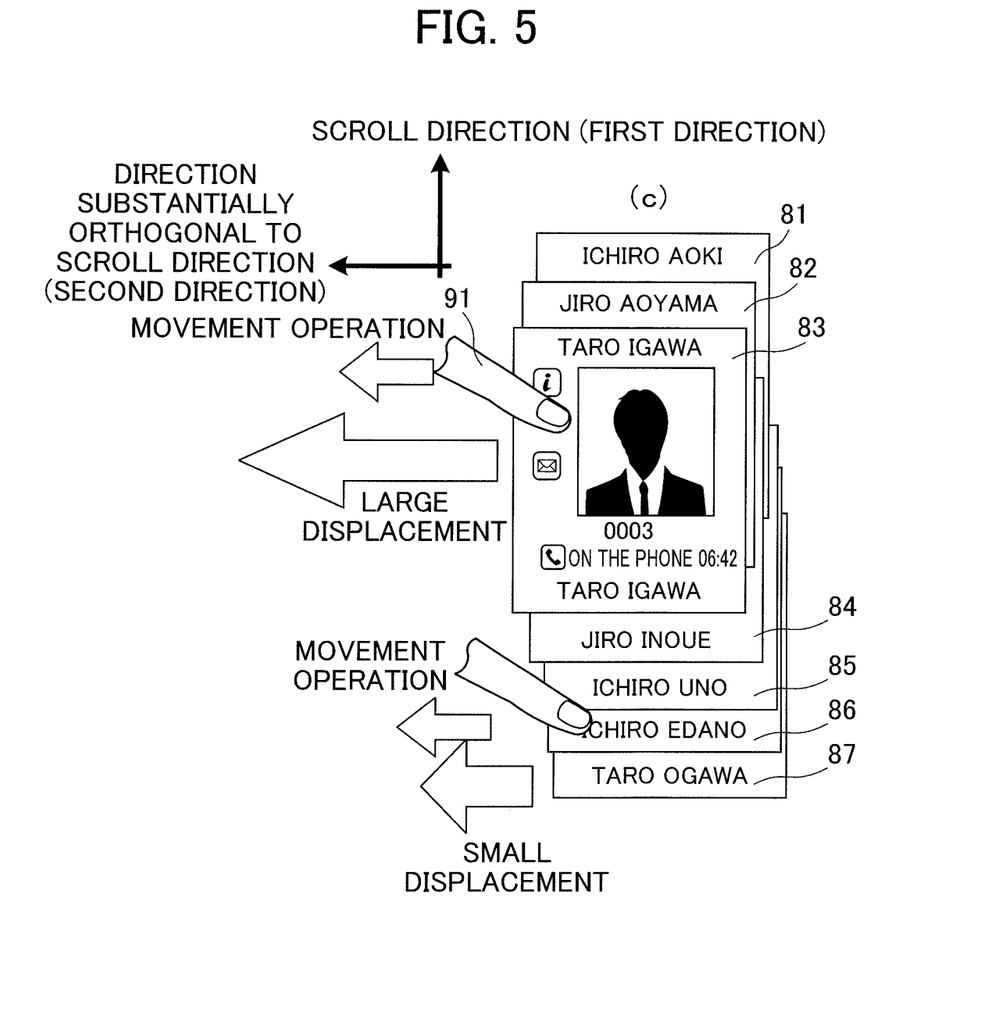
FIG. 5 is a schematic diagram showing a display example of the display unit in the second direction movement display processing.

In order to facilitate understanding, the second direction movement display processing is described by using a specific example of the card images 81 to 87 in FIG. 5 as appropriate.

As shown in FIG. 5, in a state where the sequence of card images 81 to 87 is displayed as being sequentially superposed in the first direction (the scroll direction), the user can perform a movement operation that is a touch operation to select a desired card image from the card images 81 to 87 so as to move in the second direction, i.e. an operation to move the desired card image in the second direction while touching on the card image with a finger or the like.

The movement operation receiving unit 46 receives the movement operation, based on temporal transition of the position of the touch operation on the touchscreen by the user (the touched position on the touchscreen), and notifies the displacement determination unit 47 of the result.

At this time, the superposition order determination unit 44 notifies the displacement determination unit 47 of the superposition order of each of the card images 81 to 87 at the point in time when the movement operation is started.

Regarding the card image designated from among the card images 81 to 87 by the movement operation, the displacement determination unit 47 determines displacement of the card image in the second direction, based on the superposition order notified from the superposition order determination unit 44.

For example, in the present embodiment, the displacement determination unit 47 determines displacement in the second direction, such that a card image with a higher superposition order has larger displacement.

More specifically, for example, in the example shown in FIG. 5, in a case in which the user performs a movement operation by selecting the card image 83 to be moved, since the card image 83 is displayed with the first superposition order, i.e. displayed on the top, the displacement thereof in the second direction is determined to be a maximum.

In contrast, in a case in which the user performs a movement operation by selecting the card image 86 to be moved, since the card image 86 is displayed with the sixth superposition order, i.e. the card image 86 is displayed to be superposed downward, displacement thereof in the second direction is determined to be small.

Regarding the card image designated by the movement operation from among the card images 81 to 87, the second direction movement display controller 43 displays the card image to move in the second direction by the displacement determined by the displacement determination unit 47.

When the movement operation is terminated, i.e. when the user's finger or the like moves away from the touchscreen, the second direction movement display controller 43 displays the card image designated by the movement operation to move in the direction opposite to the second direction by the movement determined by the displacement determination unit 47, and displays the card image in the state before the movement operation.

In the second direction movement display processing, a card image to be moved in the second direction is not limited to a single card image in particular, and a plurality of card images may be concurrently moved. More specifically, two or more card images may be selected by a movement operation. In this case, displacement of each of the two or more card images is individually determined based on each superposition order.

Figure 6:
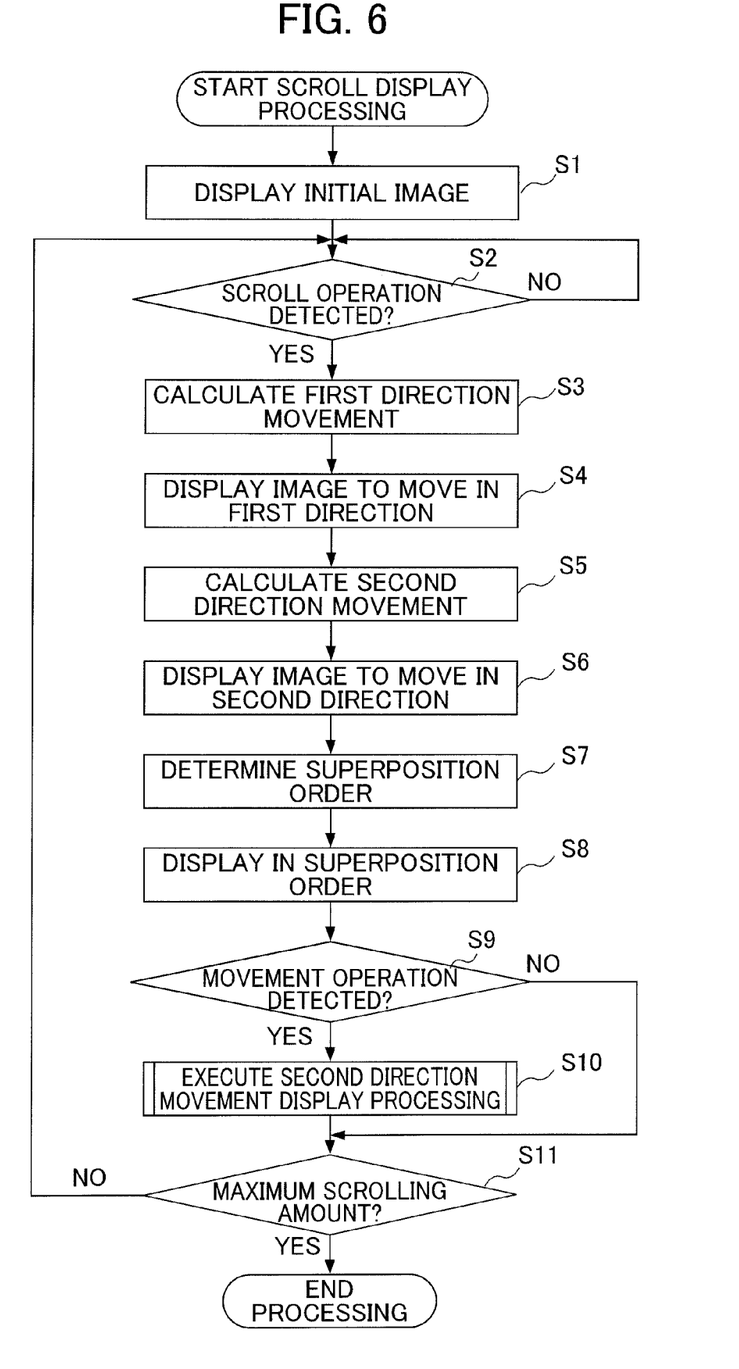
FIG. 6 is a flow diagram showing a flow of the scroll display processing to be executed by the display controller of FIG. 1 having the functional configuration of FIG. 2.

Referring now to FIG. 6, descriptions are provided for the scroll display processing to be executed by the display controller 1 having the functional configuration shown in FIG. 2.

FIG. 6 is a flow diagram showing a flow of the scroll display processing to be executed by the display controller 1 of FIG. 1 having the functional configuration of FIG. 2.

FIG. 6 shows an example in which the second direction movement display processing is executed within the scroll display processing.

The scroll display processing is initiated based on a predetermined operation to instruct initiation of the scroll display processing, among touch operations on the touchscreen by the user.

Figure 4:
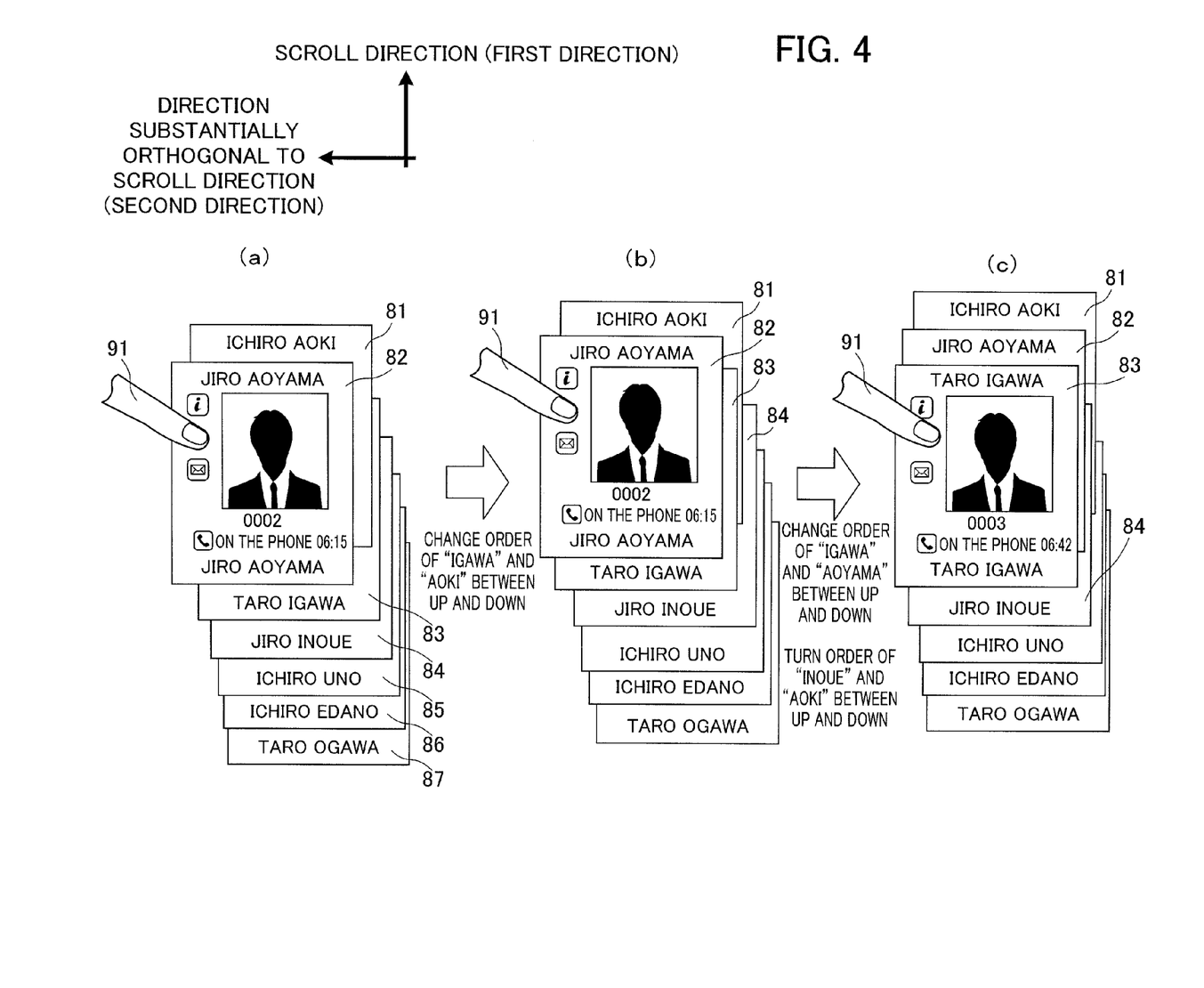
FIG. 4 is a schematic diagram showing a display example of a display unit in the scroll display processing.

In Step S1, the initial image display controller 41 acquires a sequence of a plurality of information items from the continuous information storage table stored in the storage unit 18; generates data of a sequence of a plurality of card images (the card images 81 to 87 in the aforementioned example shown in FIG. 4) based on the sequence of the plurality of information items; and displays each of the sequence of the plurality of card images to be superposed in a default order on the display unit 17. In a case in which the data of the card images 81 to 87 of the example in FIG. 4 is generated as the data of the sequence of the plurality of card images, the card images 81 to 87 are displayed in a manner as shown in FIG. 4A.

In Step S2, the scroll operation receiving unit 45 determines whether a scroll operation is performed on the touchscreen by the user.

In a case in which the scroll operation is not performed, the determination in Step S2 is NO, and the processing returns to Step S2. Therefore, until the scroll operation is performed, the determination processing in Step S2 is repeated, in which the scroll display processing is in a stand-by state.

In a case in which the scroll operation is performed, the determination in Step S2 is YES, and the processing advances to Step S3.

In Step S3, the first direction movement calculation unit 51 extracts a first direction component of the scroll operation detected in Step S2, and calculates movement of each of the sequence of the plurality of card images in the first direction, based on the extracted first direction component.

In Step S4, the first direction movement display controller 42 causes the display unit 17 to display the card images 81 to 87 to move in the first direction by the movement amount.

In Step S5, based on the movement of the card images 81 to 87 in the first direction calculated by the first direction movement calculation unit 51, the second direction movement calculation unit 52 calculates movement of the card images 81 to 87 in the second direction or in the direction opposite thereto.

In Step S6, the second direction movement display controller 43 causes the display unit 17 to display the card images 81 to 87 to move in the second direction or the direction opposite thereto by the movement.

For illustrative purposes, the processing of the movement display in the first direction is executed (in Steps S3 and S4), and the processing of the movement display in the second direction is subsequently executed (in Steps S5 and S6); however, the order of the processing is not limited in particular. In other words, in practice, the processing of the movement display in the first direction (in Steps S3 and S4) and the processing of the movement display in the second direction (in Steps S5 and S6) are independently executed in parallel; therefore, the order of the processing is not limited in particular.

In Step S7, based on each displacement of the sequence of the plurality of card images in the second direction after the movement display in Step S6, the superposition order determination unit 44 determines each superposition order of the sequence of the plurality of card images.

In Step S8, the superposition order determination unit 44 causes the display unit 17 to display the sequence of the plurality of card images to be superposed in the determined superposition order.

In Step S9, the movement operation receiving unit 46 determines whether a movement operation on the touchscreen is performed by the user.

In a case in which the movement operation is performed, the determination in Step S9 is YES, and the second direction movement display processing is executed in Step S10. Details of the second direction movement display processing will be described later with reference to FIG. 7. When the second direction movement display processing is executed in Step S10, the processing advances to Step S11.

In contrast, in a case in which the movement operation is not performed, the determination in Step S9 is NO, and the processing advances to Step S11 without executing the second direction movement display processing in Step S10.

In Step S11, the first direction movement display controller 42 determines whether the displacement of the sequence of the plurality of card images in the first direction has reached a predetermined quantity (the maximum scrolling amount). More specifically, the first direction movement display controller 42 determines whether the sequence of the plurality of card images have moved in the first direction to the maximum limit.

In a case in which the displacement in the first direction has not reached the maximum scrolling amount, the determination in Step S11 is NO, and processing returns to Step S2 to repeat the processing thereafter. In other words, the loop processing from Steps S2 to S11 is repeatedly executed until the displacement in the first direction reaches the maximum scrolling amount.

On the other hand, in a case in which the displacement in the first direction has reached the maximum scrolling amount, the determination in Step S11 is YES, and the scroll display processing is terminated.

As described above, through the combination of the processing of the movement display in the first direction (in Steps S3 and S4) and the processing of the movement display in the second direction (in Steps S5 and S6), each of the sequence of the plurality of card images (the card images 81 to 87 in the example shown in FIG. 4) is displayed to move overall in an approximate dogleg shape or an approximate arc. Furthermore, through Steps S7 and S8, an image with larger displacement in the second direction has a higher superposition order, and the sequence of the plurality of card images is displayed to be superposed in the superposition order.

Figure 7:
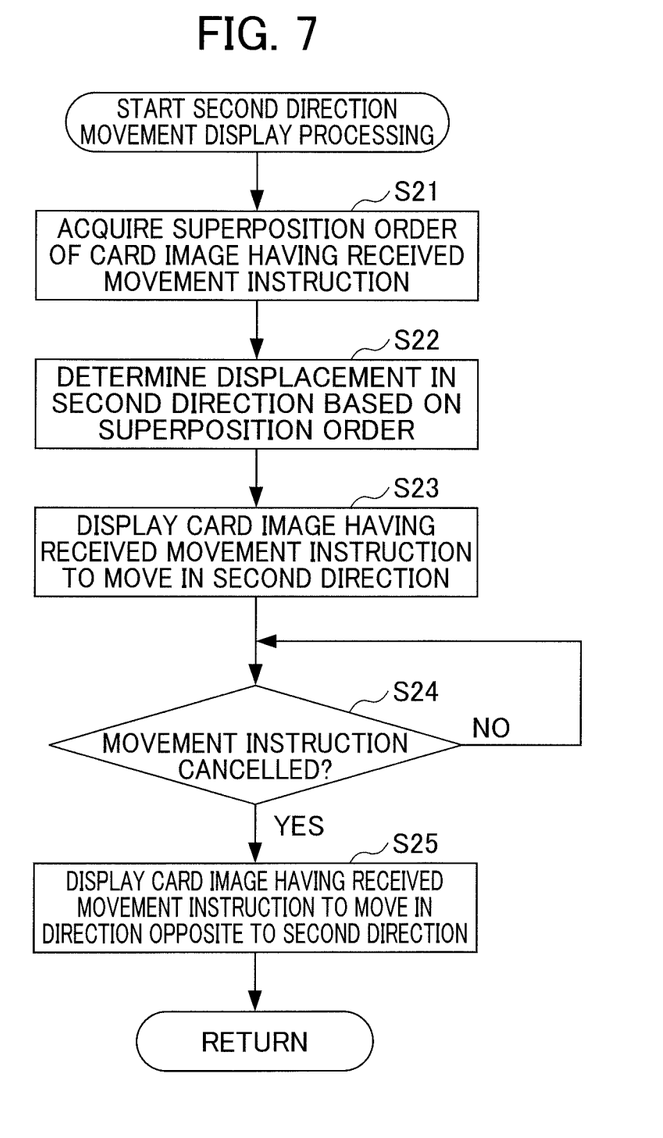
FIG. 7 is a flow diagram showing a flow of the second direction movement display processing to be executed by the display controller of FIG. 1 having the functional configuration of FIG. 2.

Referring now to FIG. 7, descriptions are provided for the second direction movement display processing to be executed by the display controller 1 having the functional configuration shown in FIG. 2.

FIG. 7 is a flow diagram showing a flow of the second direction movement display processing to be executed by the display controller 1 of FIG. 1 having the functional configuration of FIG. 2.

The second direction movement display processing is initiated when a movement operation is performed by the user, among touch operations on the touchscreen.

More specifically, in a case in which a movement operation is performed while executing the scroll display processing in FIG. 6, the determination in Step S8 is YES, and the second direction movement display processing is initiated as the processing in Step S9. Even if the scroll display processing is not executed, the second direction movement display processing is executed when a movement operation is performed.

In Step S21, the superposition order determination unit 44 acquires a superposition order of a card image having received a movement instruction, and notifies the displacement determination unit 47 of the superposition order.

In Step S22, the displacement determination unit 47 determines displacement of the card image having received the movement instruction in the second direction, based on the superposition order acquired in Step S21.

In Step S23, the second direction movement display controller 43 displays the card image having received the movement instruction in the second direction by the displacement determined in Step S22.

In Step S24, the movement operation receiving unit 46 determines whether the movement instruction is cancelled, i.e. whether the movement operation on the touchscreen by the user is terminated.

In a case in which the movement instruction is not cancelled, the determination in Step S24 is NO, and the processing returns to Step S24. More specifically, until the movement instruction is cancelled, the determination processing in Step S24 is repeated, in which the second direction movement display processing is in a stand-by state. In this case, the card image having received the movement instruction is displayed while maintaining the state of having moved in the second direction by the displacement determined in Step S22.

In a case in which the movement instruction is cancelled, the determination in Step S24 is YES, and the processing advances to Step S25.

In Step S25, the second direction movement display controller 43 displays the card image having received the movement instruction to move in the direction opposite to the second direction.

As a result, the card image having received the movement instruction is displayed in the state before the movement operation, and the second direction movement display processing is terminated.

In the present embodiment, the scroll display processing and the second direction movement display processing are executed by script processing based on a Web HTML. As a result, the scroll display processing and the second direction movement display processing are executed at higher speed.

As described above, according to the present embodiment, the display controller 1 displays each of the sequence of the plurality of card images (the card images 81 to 87 in the example shown in FIG. 4) to move in the first direction, and to move back and forth in the second direction, in accordance with scroll operation type. The display controller 1 determines a superposition order of displaying each of the sequence of the plurality of card images in accordance with displacement of a display position of each of the sequence of the plurality of card images in the second direction, and displays each of the sequence of the plurality of card images to be superposed in the order on the display unit 17. As a result, each of the sequence of the plurality of card images is displayed to move overall in an approximate dogleg shape or an approximate arc; a superposition order of the sequence of the plurality of card images is determined in accordance with the displacement of the images in the second direction; and each of the sequence of the plurality of card images is displayed to be superposed in the order on the display unit 17. This makes it possible to improve the visibility of the sequence of the plurality of card images corresponding to the sequence of the plurality of information items.

Furthermore, the display controller 1 displays the card images, such that a card image with larger displacement of each display position of the card images in the second direction is displayed with a higher superposition order. Therefore, each of the sequence of the plurality of card images is displayed to move overall in an approximate dogleg shape or an approximate arc; and an image with the maximum displacement in the second direction is displayed on top. Therefore, the visibility of an image corresponding to noteworthy information is improved.

Furthermore, in the display controller 1, the display size (resolution) of each of the card images is constant. Therefore, the visibility of a card image corresponding to noteworthy information is improved, even if the display size of a plurality of card images is not dynamically changed.

Furthermore, the display controller 1 receives a movement operation representing an instruction to designate one or more images from among a sequence of card images (the card images 81 to 84 in the example shown in FIG. 5), and to move the designated one or more images in the second direction substantially orthogonal to the first direction.

The display controller 1 individually determines displacement of each of the one or more images designated by the movement operation in the second direction, based on a superposition order of each of the sequence of the plurality of images.

Among the sequence of the plurality of images displayed on the display device, the display controller 1 displays each of the one or more images designated by the movement operation to move in the second direction on the display device by the respective individually determined displacements.

In this manner, by only an operation that is more intuitive, simple and easy for a user, the sequence of the plurality of card images, which may be scrolled in the first direction can be displayed to move in the second direction that is at a substantially right angle. In other words, the visibility of the sequence of the plurality of card images for the user can be improved.

More specifically, for example, a Web site can provide a system user with feeling as if using an actual business card holder, by providing a function of moving in a transverse direction (the second direction) to two-dimensional representations. Furthermore, although not illustrated, by shading the left-most card image, it would also be possible to provide a three-dimensional effect as if actually turning over a card.

The embodiment of the present disclosure has been described above; however, the present disclosure is not limited to the aforementioned embodiment. The effects described in the present embodiment are merely examples of the most preferred effects arising from the present disclosure; and the effects by the present disclosure are not limited to those described in the present embodiment.

In the present embodiment, the first direction movement display controller 42 detects a scroll operation by the user from the touchscreen; however, the present invention is not limited thereto. For example, the first direction movement display controller 42 may detect a scroll operation by the user from a mouse, by applying the mouse as an input unit.

In the present embodiment, the first direction movement display controller 42 displays the card images 81 to 87 to move only in the first direction; however, it is not limited thereto, and the card images may be displayed to move in the direction opposite to the first direction.

In the present embodiment, the first direction movement display controller 42, etc. control display of seven images as the card images 81 to 87; however, it is not limited thereto, and the number of images may be six or less, or may be eight or more.

In the abovementioned embodiment, a touchscreen tablet is described as an example of the display controller 1 to which the present disclosure is applied; however, the present invention is not limited thereto in particular.

For example, the present disclosure can be applied to general electronic devices having a display function. More specifically, for example, the present disclosure can be applied to a laptop personal computer, a television receiver, a video camera, a portable navigation device, a cellular telephone device, a portable gaming machine, etc.

The sequence of processing described above can be executed by hardware and/or software.

In other words, the functional configuration shown in FIG. 2 is merely an exemplification, and is not limited thereto in particular.

In other words, it is sufficient for the display controller 1 to include a function capable of executing the aforementioned sequence of processing as a whole; and which functional block should be used to implement the function is not particularly limited to the example shown in FIG. 2. A single functional block may be configured by a single piece of hardware, a single piece of software, or a combination thereof.

In a case in which processing sequence is executed by software, a program configuring the software is installed from a network or a recording medium into a computer, etc. The computer may be a computer incorporated into specialized hardware. The computer may be a computer such as a general-purpose personal computer capable of executing various functions by installing various programs.

The storage medium containing such a program may not only be configured by the removable medium 31 shown in FIG. 1 distributed separately from the device main body for supplying the program to the user, but may also be configured by a storage medium or the like provided to the user in a state incorporated in the device main body in advance. The removable medium 31 is configured by, for example, a magnetic disk (including a floppy disk), an optical disk, a magnetic optical disk, or the like. The optical disk is configured by, for example, a CD-ROM (Compact Disk-Read Only Memory), a DVD (Digital Versatile Disk), or the like. The magnetic optical disk is configured by an MD (Mini-Disk) or the like. The storage medium provided to the user in a state incorporated in the device main body in advance is configured by, for example, the ROM 12 shown in FIG. 1, or a hard disk included in the storage unit 18 shown in FIG. 1 or the like, in which the program is recorded.

In the present specification, the steps describing the program recorded in the storage medium include not only processing executed in a time series following this order, but also processing executed in parallel or individually, which is not necessarily executed in a time series.

In the present specification, the term "system" means a general apparatus composed of a plurality of devices, a plurality of members, etc.

What is claimed is:

1. A display controller comprising:
a processor; and
a memory coupled to the processor, the memory storing instructions that, when executed by the processor, cause the display controller to perform actions comprising:
causing a predetermined display device to display a sequence of a plurality of images, which respectively correspond to a sequence of a plurality of information items, to be sequentially superposed and arranged in a first direction;
receiving a scroll operation in the first direction;
causing the display device to display each of the sequence of the plurality of images, which are displayed on the display device, to move in the first direction in accordance with the scroll operation;
receiving a movement operation representing an instruction to designate one or more images from among the sequence of the plurality of images, and to move the designated one or more images in a second direction substantially orthogonal to the first direction;
individually determining displacement of each of the one or more images designated by the movement operation, in the second direction, based on a superposition order of each of the sequence of the plurality of images; and
displaying each of the one or more images designated by the movement operation, among the sequence of the plurality of images displayed on the display device, to move in the second direction on the display device, by the respective displacements individually determined.

2. The display controller according to claim 1, wherein the displacement in the second direction is determined such that an image with a higher superposition order has larger displacement.

3. The display controller according to claim 2, wherein display size of each of the sequence of the plurality of images is constant on the display device.

4. The display controller according to claim 1, wherein display size of each of the sequence of the plurality of images is constant on the display device.

5. A display control method executed by a display controller, the method comprising:
an initial image display controlling step of causing a predetermined display device to display a sequence of a plurality of images, which respectively correspond to a sequence of a plurality of information items, to be sequentially superposed and arranged in a first direction;
a scroll operation receiving step of receiving a scroll operation in the first direction;
a first direction movement display controlling step of causing the display device to display each of the sequence of the plurality of images, which are displayed on the display device by the control processing in the initial image display controlling step, to move in the first direction in accordance with the scroll operation;
a movement operation receiving step of receiving a movement operation representing an instruction to designate one or more images from among the sequence of the plurality of images, and to move the designated one or more images in a second direction substantially orthogonal to the first direction;
a displacement determination step of individually determining displacement of each of the one or more images designated by the movement operation in the second direction, based on a superposition order of each of the sequence of the plurality of images; and
a second direction movement display controlling step of displaying each of the one or more images designated by the movement operation, among the sequence of the plurality of images displayed on the display device under the control of the initial image display controlling step or the first direction movement display controlling step, to move in the second direction on the display device, by the respective displacements individually determined in the displacement determining step.

6. A non-transitory recording medium storing a program for causing a computer, which controls a display controller, to execute control processing comprising:
an initial image display controlling step of causing a predetermined display device to display a sequence of a plurality of images, which respectively correspond to a sequence of a plurality of information items, to be sequentially superposed and arranged in a first direction;

a scroll operation receiving step of receiving a scroll operation in the first direction;

a first direction movement display controlling step of causing the display device to display each of the sequence of the plurality of images, which are displayed on the display device by the control processing in the initial image display controlling step, to move in the first direction in accordance with the scroll operation;

a movement operation receiving step of receiving a movement operation representing an instruction to designate one or more images from among the sequence of the plurality of images, and to move the designated one or more images in a second direction substantially orthogonal to the first direction;

a displacement determination step of individually determining displacement of each of the one or more images designated by the movement operation, in the second direction, based on a superposition order of each of the sequence of the plurality of images; and a second direction movement display controlling step of displaying each of the one or more images designated by the movement operation, among the sequence of the plurality of images displayed on the display device under the control of the initial image display controlling step or the first direction movement display controlling step, to move in the second direction on the display device, by the respective displacements individually determined in the displacement determining step.

* * * * *